March 24, 1964 W. L. McMILLAN 3,126,486

PHASE STABLE SWITCHING CIRCUITS

Filed May 29, 1959 2 Sheets-Sheet 1

INVENTOR
WILLIAM L. Mc MILLAN

BY William V. Schelberg
AGENT

March 24, 1964 W. L. McMILLAN 3,126,486

PHASE STABLE SWITCHING CIRCUITS

Filed May 29, 1959 2 Sheets-Sheet 2

United States Patent Office 3,126,486

Patented Mar. 24, 1964

3,126,486

PHASE STABLE SWITCHING CIRCUITS

William L. McMillan, Little Rock, Ark., assignor to International Business Machines Corporation, New York, N.Y., a corporation of New York Filed May 29, 1959, Ser. No. 816,763

16 Claims. (Cl. 307—88)

This invention relates to switching circuits, and more particularly to switching circuits in a carrier system employing multiphase stable devices.

A multiphase stable device may be defined as a device capable of resonating at some frequency which may be a subharmonic frequency of the exciting frequency and of providing distinguishable output signals which differ with respect to one another by a phase relationship. A particular form of such a device is one which is adapted to provide two phase differing output signals, which, at one time, provides a first output waveform and, when triggered or switched, provides a second output waveform distinguishable from the first, which differ by an angular phase displacement of 180°. A particular example of one form of a multiphase stable device as implemented in logical switching circuits capable of use in data processing systems has been disclosed by J. Von Neumann in his Patent 2,815,488 and further described in an article entitled, "A New Concept in Computing," by R. L. Wigington, Proc. IRE, vol. 47, April 1959, pp. 516–523.

In the prior art switching circuits exemplified by the Von Neumann patent, one form of a multiphase stable device is employed as the basic element and is known as a subharmonic parametric oscillator which is capable of providing phase distinguishable outputs arbitrarily designated 0 and 1. The circuits wherein parametric oscillators are employed utilize a three phase carrier system wherein the carrier is modulated in on-off fashion. Switching is then accomplished by transferring from a first line of parametric oscillators to a second line during modulation of the first line excitation carrier and from the second line of such devices to a third line during modulation of the second line excitation carrier. This type of phase system with modulation of the exciting carriers allows lower power requirements in transfer of information from one line device to another line device and insures uni-directional information flow between the different line devices. The basic type of switching operation performed by such circuits and elements aside from direct transfer is majority type logic wherein an odd numbered plurality of inputs to one line transferee element from a previous line of transferor elements is entered and the operating state of the transferee element is determined by the operating state of the majority of transferor elements. To accomplish this basic majority type switching operation, a minimum of three first line elements excited by a first phase carrier is necessitated to first register the information which is transferred to a second line device which is excited by a second phase carrier wherein the majority manifestation is actually performed.

It has been found that switching circuits employing carrier modulation excitation may be constructed to perform most any desired operation on two input variables and to perform binary logic on three or more variables in one time step. What is meant is that the basic operation of majority logic described above may be accomplished within the time information is registered into the first ilne elements. A circuit capable of performing logic within one time step as above described may be constructed according to the embodiments of this invention and comprises a plurality of multiphase stable devices, such as non-linear type circuits known as parametric oscillators and other devices such as relaxation oscillators, which have a plurality of control means coupled to each which is capable of acting as both an input and/or output of the device. A first control means of each device is serially connected in a closed loop arrangement whereby the algebraic sum of the voltages around the loop is forced to equal zero. Thus, if an even numbered plurality of multiphase stable devices, such as four, is employed, then by utilizing a second control means coupled to a first two of the devices as variable information input to the circuit, providing a third of the devices with a clock signal, then practically all logical operations of two input variables may be accomplished by manifestation of the logic at the fourth device. Due to the closed circuit arrangement, as information is entered into the first two devices and the third receives the clock signal, the instantaneous voltage must always be equal to zero, therefore all the devices within the circuit immediately adjust themselves to provide this circuit requirement and an output manifestation is immediately available. It may be seen therefore that each of the devices are so connected as to be interdependently related and to demonstrate the versatility of the novel circuit arrangement, an embodiment is shown wherein binary logic on three input variables is performed in the form of a full adder circuit.

Further, it has also been found that the circuits of this invention may not only be employed in the three phase carrier modulation system of the prior art circuits, but more strikingly by use of a switch in the circuit loop connecting each element employed, a constant carrier system may be utilized avoiding the necessity of a three phase system and modulation of the different phase carriers.

Accordingly, it is a prime object of this invention to provide novel switching circuits in a carrier type system.

Another object of this invention is to provide a novel switching circuit arrangement in a carrier type system intercoupling a plurality of multiphase stable devices.

A further object of this invention is to provide novel switching circuits for a carrier type system employing multiphase stable devices wherein the manifestation of the operation performed is accomplished in one time step.

Still another object of this invention is to provide carrier type switching circuits employing multiphase stable devices wherein the logic performing capabilities of multiphase stable devices is more efficiently utilized.

Yet a further object of this invention is to provide switching circuits employing multiphase stable devices wherein the carrier need not be modulated.

Another object of this invention is to provide a novel switching circuit employing multiphase stable devices capable of performing switching operations on two input variables.

Another object of this invention is to provide novel switching circuits employing multiphase stable devices capable of performing switching operations on three input variables.

Still another object of this invention is to provide a novel full adder switching circuit.

The foregoing and other objects, features and advantages of the invention will be apparent from the following more particular description of preferred embodiments of the invention, as illustrated in the accompanying drawings.

Figure 1:
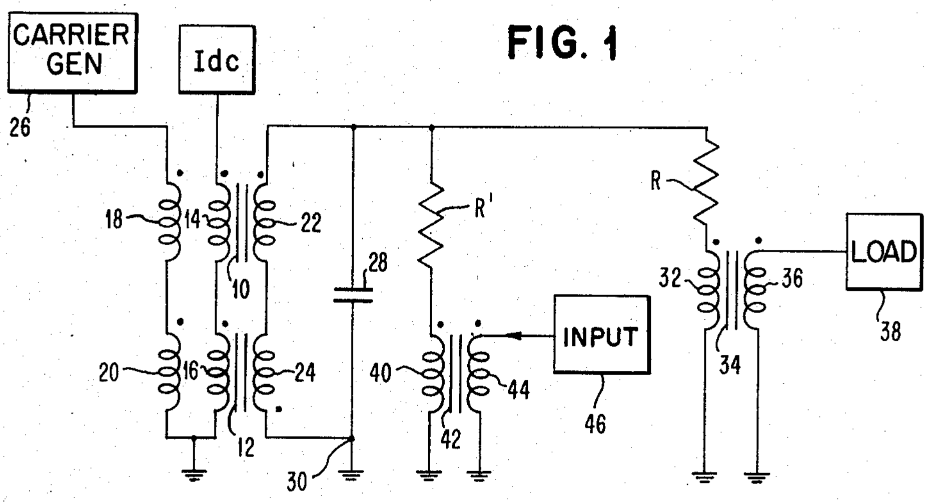
FIG. 1 is a circuit diagram of a typical subharmonic parametric oscillator which may be employed in the circuits of this invention.

Referring to the FIG. 1, a typical parametric oscillator, more popularly known as the "Parametron" is shown, which is fully described in an article entitled "Elementary Principle of Parametron and Its Application to Digital Computers," by S. Maraga, Datamation, vol. 4, No. 5, pp. 31–44, September-October 1958. As may be seen, the parametric oscillator, or parametron, has a first saturable core 10 and a second saturable core 12. Each of the cores 10 and 12 is provided with a bias winding 14 and 16, a carrier winding 18 and 20 and an output winding 22 and 24, respectively. The carrier windings 18 and 20 are serially connected from ground to a signal source generator 26 which provides an alternating current carrier of a frequency $f_0$. The bias windings 14 and 16 are serially connected from ground to a constant current source $I_{dc}$ which is adapted to bias each of the cores to a given point on their hysteresis curve as described and shown below with reference to the FIG. 2. The output windings 22 and 24 are serially connected in opposition and have a capacitor 28 connected in parallel therewith to provide a resonant circuit arrangement with one output terminal 30 connected to ground and the other output terminal connected to a primary winding 32 through a resistor R on a transformer core 34 having a secondary winding 36 connected with a load 38.

Figure 2:
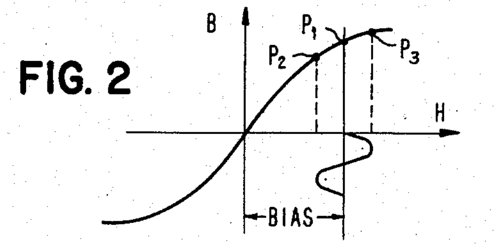
FIG. 2 is a representation of the hysteresis characteristics of the magnetic material of cores employed in the circuit of FIG. 1.

Referring now to the FIG. 2, the hysteresis characteristics required for the cores 10 and 12 employed is shown, which is a plot of flux density (B) vs. applied field (H). The cores 10 and 12 are operated about a point $P_1$ on the curve determined by the bias applied by the windings 14 and 16 energized from the source $I_{dc}$. The carrier source 26 in energizing the windings 18 and 20 on the cores 10 and 12, respectively, cause the cores to operate about the point $P_1$ having excursions indicated by the point $P_2$ and $P_3$ on the curve. The amplitude of the applied carrier is small as can be seen by the magnitude of the excursion about the point $P_1$ which are indicated by dotted lines on the curve to the abscissa H.

The value of the capacitor 28 in the FIG. 1 is found by consideration of the inductances of the cores 10 and 12 chosen by the slope of their curves at the point $P_1$ in the FIG. 2, so that the resonant frequency of the circuit is half of that of the applied carrier $f_0$, and this frequency at which the circuit resonates will hereinafter be referred to and symbolized by $f_{0/2}$. Thus, as long as the carrier source 26 in the circuit of FIG. 1 applies an alternating current of a frequency $f_0$, the circuit of FIG. 1 will oscillate at the frequency $f_{0/2}$.

The circuit of FIG. 1 is not only capable of oscilalting at a resonant frequency of $f_{0/2}$, but is also capable of providing output waveforms which are out of phase with one another by an angular displacement of 180°. The circuit then, may be considered as having waveforms as shown in the FIG. 3.

Figure 3:
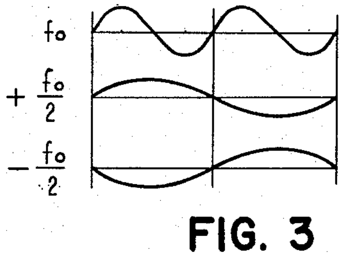
FIG. 3 is a plot of the system carrier waveform and the waveform provided by the circuit of FIG. 1.

Referring to the FIG. 3, an illustration of the input carrier waveform delivered by the carrier source 26 in the FIG. 1 is shown and labelled $f_0$ while the waveforms which the circuit of FIG. 1 is capable of producing to the load 38 through the transformer core 34 are shown and labeled $+f_{0/2}$ and $-f_{0/2}$. The polarities of the output waveforms $f_{0/2}$ connote their relative phase relationship with respect to the first quadrant. For the purposes of clarity and ease of presentation, the different states in which circuit of FIG. 1 is capable of operating, namely oscillating to provide an output waveform of $+f_{0/2}$ or $-f_{0/2}$ as is shown in the FIG. 3, is arbitrarily termed a binary 1 and a binary 0 respectively, for representing binary information.

Referring again to the FIG. 1, when the carrier 26 is first turned on the circuit oscillates to provide a binary 1 or a binary 0 output indication to the load 38 via the primary winding 32, the transformer core 34 and the output winding 36 connected to the load 38. In order to augment the device of FIG. 1 into logical systems, it has been shown, in the aforementioned article, that such a circuit may be coupled to similar type devices. Such a coupling is accomplished by providing a parallel circuit arrangement across the capacitor 28 having one end connected to ground and comprising a secondary winding 40 on a transformer core 42 serially connected to a resistor R'. A primary winding 44 is provided on the transformer core 42 having one end connected to ground and the other to an information input source 46. In passing, it should be noted that in order to switch the circuit of FIG. 1 from one operating state to another, say from the 1 state to the 0 state, a 0 input signal must be introduced into the circuit by means of the device 46 during modulation of the excitation carrier as is shown in FIG. 4.

Further, it may be seen that the coupling between the load 38 and the device 46 is substantially the same, therefore the load 38 may be a device similar to 46 and may also act as an input to the circuit while similarly the device 46 may act as a load. The coupling including the windings 32 and 40 on the cores 34 and 42, respectively, may each be considered as control means since they are adapted to act as either an input or an output to the circuit. Further control means may then be similarly coupled to the circuit to provide a plurality of input and/or output means.

Figure 4:
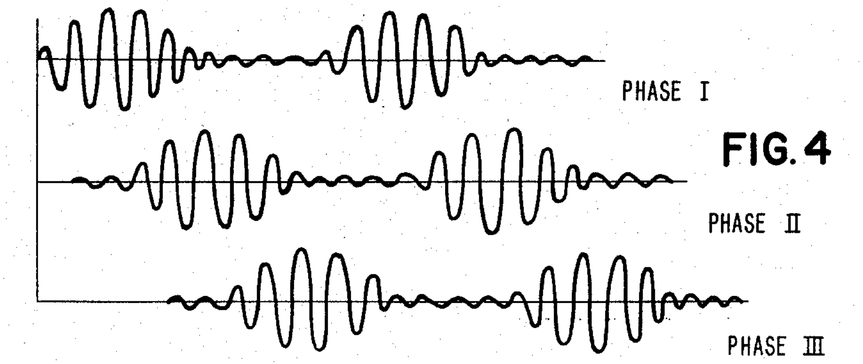
FIG. 4 is a representation of the three phase system carrier waveform employed in prior art circuits.

Referring to the FIG. 4, the on-and-off switching of the carrier $f_0$ is effected by amplitude modulation as is shown. A first carrier waveform is labelled Phase I which is employed to transfer the state of a first line parametric device to a second line parametric device whose carrier is modulated as indicated as Phase II which information in turn is transferred to a third line parametric device having a carrier waveform indicated as Phase III. The carrier system developed by the prior art devices as described in the afore-mentioned patent is a three phase system.

Figure 5:
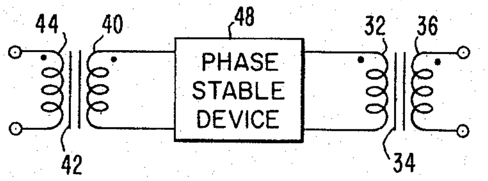
FIG. 5 is a schematic representation of the circuit of FIG. 1 in block form.

Referring to the FIG. 5, the circuit of FIG. 1 is schematically represented in block form. A block 48 is shown having the winding 32 and the winding 40 coupled to the windings 36 and 44 respectively by means of the transformer cores 34 and 42, and as may be seen, the same reference numerals are employed as is shown in the FIG. 1. Further, a dot is shown adjacent one terminal of each of the windings to denote the sense in which the windings are provided on their respective transformer cores. For instance, if a 1 input is directed to the winding 44 on the core 42, this 1 input is provided to the parametric device 48 by virtue of the winding 40 having the phase relationship as is shown by the dot. Similarly then, a 0 input directed to the winding 44 appears as a 0 to the device 48. If, however, the relationship of the windings were reversed; i.e. if a dot on the winding 40 appeared at the opposite end, then a 1 input directed to the winding 44 would appear as a 0 input to the device 48 and similarly the 0 input to the winding 44 would appear as a 1 input to the device 48.

Figure 6:
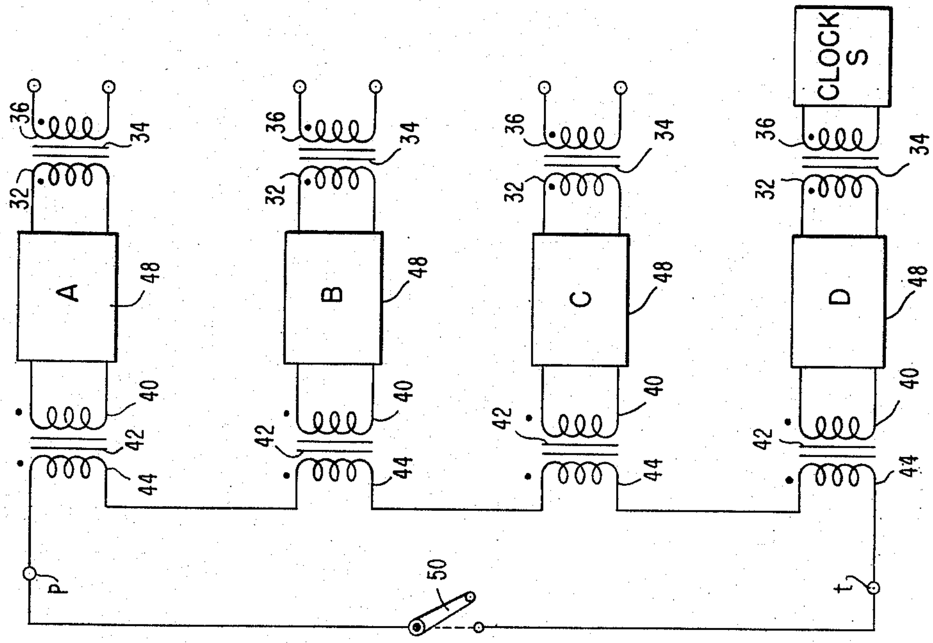
FIG. 6 is a circuit representation of one embodiment of this invention.

Referring now to the FIG. 6, an even numbered plurality of parametric oscillator devices 48 are shown and labelled A, B, C and D for distinction. Each of the devices have two control means represented by the windings 32 and 36 on the cores 34 and the windings 40 and 44 on the cores 42. For ease of presentation, the coupling to each device 48 represented by the windings 32 and 36 on the transformer core 34 will hereinafter be referred to as the first control means of any one of the devices 48 while the coupling to each device 48 represented by the windings 40 and 44 on the transformer core 42 will hereinafter be referred to as the second control means of any one of the devices 48. To help explain operation of the circuit arrangements contemplated, the second control means of each of the devices A, B, C and D are shown serially connected with a switch 50 which is adapted to either open or close the serial circuit including each device A, B, C and D. In considering operation of this circuit in the carrier modulated system of the prior art as shown in FIG. 4, the switch 50 may be disregarded and the circuit considered as a closed circuit as indicated by the dotted lines. However, use of the switch 50 will be initially referred to in helping to provide an understanding of the circuit operation. Each of the windings 44 in the circuit are connected serially aiding, and the phase relationship within the first and second control coupling means is a direct relationship; i.e. a 0 into the device 48 appears as a 0 and a 0 out of the device 48 appears as a 0.

In explaining the operation of the following circuit the devices 48 will be considered to be in the 1 state, or phase, if at a given reference time the dotted end of the associated coupling windings 32 and 40 is positive and in the 0 state or phase if the dotted end is negative.

Considering the operation of the circuit of FIG. 6, the circuit operation is best described by considering the switch 50 as opening and closing the circuit but again it is pointed out that this swtich is not in the circuit when operated in accordance with carrier modulation as shown in the prior art. Prior to the closing of the switch 50, the parametric oscillator devices 48 as shown and labelled A, B, C and D, may be assumed to be operating in any arbitrary fashion, that is, some in the 1 state while others in the 0 state. Upon closure of the switch 50, Kirchoff's voltage law must be satisfied in that the instantaneous potentials at points labelled $p$ and $t$ in the circuit must be equal. Expressed differently, when the carrier $f_0$ is applied as shown in the FIG. 4, the subharmonic phases of the oscillators will adjust themselves to such modes as to make the difference of potential between the points $p$ and $t$ zero. Simply, this means that half the devices A, B, C and D must assume the 1 state while the other half must assume the 0 state of operation, thus causing each of the devices connected to be interdependently related. For example, assume that prior to closure of the switch 50, the devices A and B are brought to operate in the 1 state by means of a 1 input signal directed to the first control means of the device A and similarly a second 1 input directed to the first control means of the device B. If, then, the switch 50 is closed, the devices C and D must assume the 0 state of operation regardless of their prior operating state. On the other hand, if a 1 and a 0 were induced into the devices A and B respectively, the state which the devices C and D would assume could not be predetermined since either one may assume the 0 or 1 state to fulfill the circuit requirements. It may be seen, therefore, that in the first example the state at which the devices C and D would operate may be predicted while in the second example any output obtained from these devices would be ambiguous. Thus it may be seen that since the circuit condition of zero voltage about the loop must be satisfied when the switch 50 is closed we may now consider the circuit without the switch 50 having the closed circuit arrangement as shown by the dotted lines. When, as the exciting carrier to each of the devices A, B, C and D is modulated and information is entered into the devices A and B as described above, by virtue of the closed circuit arrangement their second control means of the devices A, B, C and D the devices C and D are forced to assume equalizing stable operating conditions.

The versatility of the closed circuit arrangement as shown in FIG. 6 to perform switching operations is best illustrated by considering a binary logical operation of NEITHER NOR, or, as expressed in Boolean algebra, $\overline{A}\,\overline{B}$. If the device D is made to continuously operate in the 1 state by a clock source S connected to its first control means, then the devices A and B may be provided with information input signals and an output from this circuit arrangement is manifested at the first control means of the device C. Assume that both the devices A and B are provided with a 0 input signal as the device C is provided with the 1 signal from the source S; it may be seen that the device C must then assume the 1 state of operation to fulfill the circuit requirements set forth above and a 1 output is derived from the first control means of the device C indicating that both the A and B inputs were 0. It is obvious that if the devices A and B are provided with a 1 and 0 input or a 0 and a 1 input, respectively, with the device D provided with a 1 input the device C assumes the 0 state of operation. The most interesting phenomena associated with this circuit is when both the devices A and B are provided with a 1 input. During input time the three devices A, B and D will oscillate in the 1 mode but when the amplitude of the carrier supplying the devices A, B, C and D becomes larger than the amplitude of the carrier exciting the input elements to the devices A, B, C and D, in accordance with FIG. 4, one of the devices A, B or D must assume the 0 state of operation to allow voltage equalization of the circuit. This change, which does not effect the element C since it operated in the 0 state, can be viewed as a type of transient phenomenon and may be utilized for the generation of special type logic. A truth table is shown below with each column designating the operation of the devices A, B, C and D wherein each row shows any one operating condition with the references 1 and 0 designating the different operating states as discussed above. It should be noted that in the input condition wherein both the devices A and B have 1 inputs thereto, the operating condition of the device D is arbitrarily chosen to assume the 0 state.

| A | B | C | D |
|---|---|---|---|
| 1 | 0 | 0 | 1 |
| 0 | 1 | 0 | 1 |
| 0 | 0 | 1 | 1 |
| 1 | 1 | 0 | 0 |

Thus, an output derived from the device C indicates the NEITHER NOR function. By interchanging the terminals of the winding 36 of the first control means of the device C, for all the conditions above indicating a 0 operating condition, a 1 output is derived providing the inverse logical function of NEITHER NOR which is INCLUSIVE OR.

It is known that there are sixteen different functions of two input variables wherein eight are merely inverse functions of the other eight and need not be considered since inversion of an original function is easily accomplished as shown above. The single order function of A or that of B may also be disregarded as trivial since these are merely transfer functions realized by transfer through any one device. The only functions left then are as expressed in Boolean algebra, $F_1=AB$; $F_2=A\overline{B}$; $F_3=\overline{A}B$; $F_4=A+B$; and $F_5=A\oplus B$. Since, as described above, due to the very nature of the control means of each device, any one output indication or input variable may be inverted by reversing the winding directions, the function $F_2$, $F_3$ and $F_4$ are easily obtained by inverting the input variable in the circuit of FIG. 6. The function $F_1$ has already been considered, i.e. INCLUSIVE OR, and only the function $A\oplus B$, i.e. EXCLUSIVE OR, cannot be conveniently generated in the circuit of FIG. 6 in a straightforward manner. It should be understood that although only one circuit loop is shown, other similar type loops may be employed coupled by means of further windings on the control means of each device. Also, circuits employing any even numbered plurality may be constructed to perform binary logic on three input variables. A typical operator capable of performing binary logic on three input variables is one which accomplishes the function of a full adder and such a circuit will be described in detail subsequently with respect to the FIG. 7.

Figure 7:
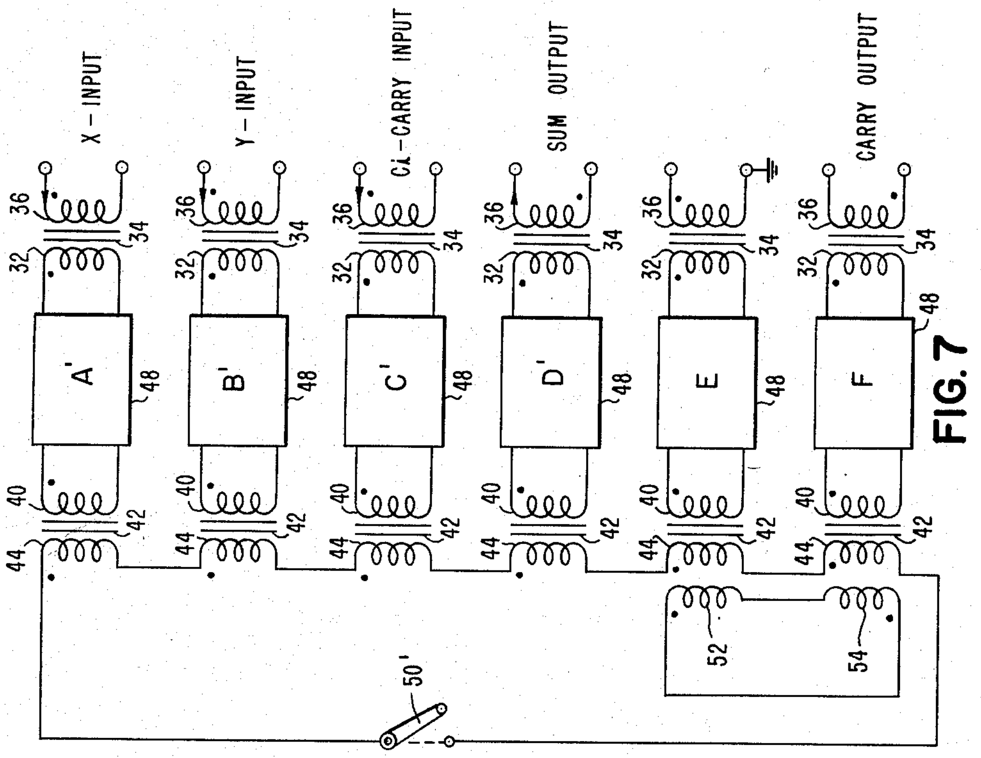
FIG. 7 represents another embodiment of this invention.

Referring to the FIG. 7, a two loop switching circuit is shown which is capable of operation as a binary full adder. More specifically, six parametric devices 48, labelled A′, B′, C′, D′, E and F, are shown each of which have a first and a second control means. The second control means of each device A′, B′, C′, D′, E and F are connected series aiding with a switch 50′ which again is only shown to help describe the circuit operation, and this connection is hereinafter referred to as loop A. The devices E and F have a further winding 52 and 54, respectively, coupled to the respective second control means; i.e. their transformer cores 42, series opposed, which connection is hereinafter referred to as loop B. The windings 52 and 54 in loop B insure that the devices E and F always assume the same state of operation. This may be understood by considering the winding arrangements of the windings 52 and 54 on their respective cores 42. If the device E operates in the 1 state, the induced output on the winding 52 must be cancelled by virtue of the short circuit arrangement of loop B and accordingly the winding 54 must provide a 0 signal. Note, however, the relationship of the winding 54 on the core 42 of F with respect to the winding 40. If the winding 54 is to provide a cancelling 0 signal, the device F must operate in the 1 state. It may be seen, by employing the same logic, that cancellation in loop B is provided again when both the devices E and F operate in the 0 state.

The first control means of the device A′ is employed as an information input as is the first control means of the device B′, which are labelled X and Y input, respectively, to denote the information variables to be added. The first control means of the device C′ is employed as a carry input line and is labelled $C_i$. The sum output of the adder is provided at the first control means of the device D′ while the carry output is provided at the first control means of the device F. The winding relationship of the windings 32 and 36 on both the devices D′ and F are reversed so that, as explained above, if the devices D′ and F operate in the 0 state, a 1 output is provided.

Assume initially that one of the inputs X or Y is energized with a 1 input signal while the other is energized by a 0 input signal, and there is a no carry input to the device C′ therefore providing a 0 input to its first control means $C_i$. Upon closure of the switch 50′ it may be seen that voltages on the first control means of the devices A and B cancel as the carrier is modulated as shown in FIG. 4. In order to provide cancellation, two of the remaining devices C′, D′, E and F must assume the 0 state while the remaining assume the 1 state of operation. The device C′ is being held in the 0 state by the 0 carry input thereto, therefore the devices E and F must assume the 1 state while the device D assumes the 0 state of operation. This condition is forced by virtue of the loop B circuit arrangement which forces both the devices E and F to operate in the same state as described above. Since the device C′ is being held in the 0 state, and the devices E and F must operate in the same state, the devices E and F must then assume the 1 state while the device D′ assumes the 0 state. The device D′ in assuming the 0 state of operation provides a 1 output on the sum output line by virtue of the reversed winding relationship of its first control means as described above.

Assume the switch 50′ is opened and both the X and Y inputs are 1 while the carry input is 0. Upon closure of the switch 50′, it may be seen that since the devices A′ and B′ are held in the 1 state by their inputs as is the device C′ held in the 0 state by its input, two of the devices D′, E and F must assume the 0 state of operation while one assumes the 1 state of operation. Again, due to the loop B arrangement, the devices E and F assume the 0 state of operation while the device D′ assumes the 1 state. Since the device D′ now operates in the 1 state, a 0 input is provided from the second control means of this device while a 1 carry output signal is provided on the second control means of the device F, again due to the reverse relationship of the windings 32 and 36 on the core 34 of this device.

After the switch 50′ is opened, assume that a 1 input is directed from each of the inputs X, Y and $C_i$ to the devices A′, B′ and C′ respectively. Upon closure of the switch 50′, since during modulation of the carrier each of the devices A′, B′ and C′ are held in the 1 state of operation, the devices D, E and F assume the 0 state of operation. Then, since the devices D and F have assumed the 0 state of operation, a 1 signal is provided on both the sum and carry output lines. In some systems where it is necessary to provide not only the 1 state designation for the carry output, but also the 1 state designation for no carry output on a different line, the output provided at the first control means of the device E may be employed for such a no-carry designation. Again, the circuit operation described above by considering the switch 50′ in the circuit was only for the purposes of clarity since each of the devices, A′, B′, C′, D′, E and F may be utilized in a phased carrier modulation system wherein each of these devices would be excited by the same phase carrier.

The utilization of such devices is apparent since these devices are designed to operate with further similar circuitry and since all logical operators of two input variables have been demonstrated except EXCLUSIVE OR, it is apparent that any further desired logic may be accomplished by coupling such circuits to one another or, as shown in the FIG. 7 provide other short circuitry arrangements to accomplish the desired result. It should be understood, that while the circuit of loop B of FIG. 7 has been shown without incorporating other logical devices, such an arrangement may be provided to accomplish further desired switching operations.

Although, in each of the instances recited above with respect to the FIGS. 6 and 7 the circuits were considered as operated with carrier modulation, in most cases these circuits operate equally well without the necessity of carrier modulation. It is pointed out, however, that when a constant carrier system is employed; i.e. one wherein there is no modulation of the carrier and no phased carriers within the system, the preferred circuit embodiments as shown in the FIGS. 6 and 7 including the switches 50 and 50′, respectively, are utilized to switch any one of the devices 48 in the closed circuit arrangement. Consider, for instance, the circuit of FIG. 6 and assume initially that the switch 50 is open and the devices A and B are made to operate in the 1 state and are being held in this operating state by inputs directed to their first control means. Upon closure of the switch 50, Kirchoff's law must again be satisfied and the devices C and D are forced to assume the 0 state of operation. Considering the circuit without the switch 50 it may be seen that if signals are directed to the first control means of the devices A and B which are of sufficient power to cause both A and B to operate in the 1 state, instantaneously, the devices C and D must assume the 0 state of operation. However, the power required to cause these devices to switch in the closed circuit arrangement without the switch 50 has proved to be prohibitive from an energization aspect. Consider the circuit of FIG. 7 without use of carrier modulation. It may be seen that if the switch 50′ is open and inputs directed to the devices A′, B′ and C′ are such to cause the devices to assume either the 1 or 0 state and also to hold the devices in such an operative state, when the switch 50′ is closed the remaining devices must react exactly as described above for the various input conditions. Without the switch 50′, it may be seen that the circuit response is instantaneous but again the power requirements are prohibitive. Further, while an even numbered plurality of parametric oscillator devices have been shown, it is obvious that what is meant is devices whose operating characteristics are similar in that the output voltage waveform from each is similar. To provide an odd number of such devices coupled in a closed circuit arrangement wherein one provides an output equal to twice the magnitude of any other one may also be accomplished without departing from the scope of the invention which generally is to connect such devices in a series circuit arrangement.

Thus, while the invention has been particularly shown and described with reference to preferred embodiments thereof, it will be understood by those skilled in the art that various changes in form and details may be made therein without departing from the spirit and scope of the invention.

What is claimed is:

1. In a carrier system, a plurality of devices each capable of assuming different phase stable operating states, control means coupled to each said device, and further means intercoupling the control means of said devices for interdependently relating the operating states which said devices assume.

2. In a carrier system, a plurality of multiphase stable devices each capable of assuming different stable operating states, control means coupled to each said device, means connecting the control means of said devices in a series circuit whereby the operating state which any one of said devices assumes is interdependently related to the different operating states of the remaining of said devices.

3. In an information carrier switching system, a plurality of devices each capable of assuming different phase stable operating states, a plurality of control means coupled to each said device, means for energizing a first one of said control means on a predetermined number of said devices whereby the associated devices assume said different operating states to represent said information, and further means including a second one of said control means of said plurality of devices interconnecting said devices for interdependently relating the operating states which said plurality of devices assume.

4. The circuit of claim 2, wherein said plurality of devices is an even numbered plurality.

5. In a carrier type system, an information switching circuit comprising, an even numbered plurality of multiphase stable devices, a first and a second control means coupled to each said device, further means serially connecting the first control means of each said device in a bidirectional current conductive circuit thereby causing one of said devices to operate in a datum stable state for each of said devices operating in an opposite stable state, means for energizing the second control means of shalf said even numbered plurality of devices to establish their associated devices in said bistable operating states in representing said information, and at least one of the second control means on the remaining half of said devices adapted to provide an output manifestation of the switching performed by said circuit determined by the operating state of the device to which said one second control means is coupled.

6. The circuit of claim 5 wherein each said control means comprises transformer means having a primary and a secondary winding with a predetermined phase relationship.

7. The circuit of claim 6 wherein the phase relationship of the primary and secondary winding of at least one of said control means is reversed.

8. A carrier type information switching circuit comprising, a first, a second, a third and a fourth multiphase stable device each capable of assuming bistable operating states, control means couplied to each said device, further means serially connecting a first of said control means on said first device with a first of said control means of said second, third and fourth devices whereby half said devices assume a datum stable operating state and the remaining assume an opposite stable operating state, means including a second one of said control means on said fourth device for maintaining said fourth device in a datum stable operating state, signal means for energizing a second one of the control means of said first and second devices to establish said first and second devices in said bistable operating states to represent said information whereby a second one of said control means on said third device provides a manifestation of the switching accomplished determined by the operating stable state of said third device.

9. In a carrier type system, a plurality of devices each capable of assuming differing phase stable operating states in response to information input, means coupling a first predetermined number of said devices for interdependently relating the operating states assumed by said first predetermined number of devices, further means coupling a second predetermined number of said devices including devices of said first predetermined number for interdependently relating the operating states assume by said second predetermined number of devices and for dependently relating the operating states assumed by said first and second predetermined number of devices.

10. In a carrier type system, a plurality of devices capable of assuming different phase stable operating states in response to information input, control means coupled to each said device, means serially connecting a first of said control means on a first predetermined plurality of said devices for interdependently relating the operating states assumed by said first predetermined plurality of devices, further means serially coupling the first control means of a second predetermined number of said devices including devices of said first predetermined number for interdependently relating the stable operating states assumed by said second predetermined plurality of devices and for dependently relating the operating states assumed by said first predetermined number of devices to the operating states assumed by said second predetermined number of devices.

11. In a carrier system, a plurality of devices each capable of assuming different phase stable operating states, control means coupled to each said device, means connecting the control means of said devices for interdependently relating the operating states which said devices assume, and further means coupling a predetermined number of said devices for unambiguously relating the interdependency of said devices with respect to said predetermined number of devices.

12. In a carrier type system, a plurality of devices each capable of assuming different phase stable operating states, control means coupled to each said device capable of acting as both an input and an output, means serially connecting a first one of said control means of said devices for interdependently relating the operating states which said devices assume, and further means serially coupling a predetermined number of said devices for unambiguously relating the interdependency of said devices with respect to said predetermined number of devices.

13. In a carrier type system, a plurality of devices each capable of assuming different phase stable operating states, control means coupled to each said device capable of acting as both an input and an output, means connecting a first one of said control means of all said devices for interdependently relating the operating states which all said devices assume, and further means coupling a plurality but not all of said devices for unambiguously relating the interdependency of all of said devices with respect to the devices coupled.

14. In a carrier type system, a plurality of devices each capable of assuming different phase stable operating states, control means coupled to each said device capable of acting as both an input and an output, means connecting a first one of said control means of all said devices for interdependently relating the operating states which said devices assume, and further means coupling a plurality but not all of said devices for unambiguously relating the devices coupled to a same one of said stable operating states.

15. A carrier type switching circuit comprising, an even numbered plurality greater than four of multiphase stable devices, a plurality of control means coupled to each said device each capable of acting as both an input and an output, means connecting a first control means of each said device for interdependently relating the operating states of said devices so that half said devices to operate in a datum stable state and the remaining of said devices operate in an opposite stable state, and further means coupling the first control means of at least two of said plurality of devices for causing the devices coupled to assume a same one of said stable operating states.

16. A carrier type switching circuit comprising, a plurality of multiphase stable devices, a plurality of control means coupled to each said device capable of acting as both an input and an output, means serially connecting a first of said control means of each said device for interdependently relating the operating states of said devices whereby a first predetermined number of said plurality of devices operate in a datum stable state and the remaining of said plurality of devices operate in an opposite stable state, and further means serially coupling the first control means on a second predetermined number of said devices whereby said second predetermined number of devices operate in a same one of said operating stable states.

References Cited in the file of this patent

UNITED STATES PATENTS

| | | |
|---|---|---|
| 2,974,309 | Meyerhoff | Mar. 7, 1961 |

FOREIGN PATENTS

| | | |
|---|---|---|
| 778,883 | Great Britain | July 10, 1957 |
| 804,012 | Great Britain | Nov. 5, 1958 |

OTHER REFERENCES

Publication I, "The Parametron—An Amplifying Logic Element," H. Terada, Control Engineering, April 4, 1959, pp. 110–115.

UNITED STATES PATENT OFFICE

CERTIFICATE OF CORRECTION

Patent No. 3,126,486 March 24, 1964

William L. McMillan

It is hereby certified that error appears in the above numbered patent requiring correction and that the said Letters Patent should read as corrected below.

Column 1, line 69, for "ilne" read -- line --; column 3, line 48, for "point" read -- points --; line 62, for "oscilalting" read -- oscillating --; column 9, line 52, for "shalf" read -- half --; line 71, for "couplied" read -- coupled --.

Signed and sealed this 28th day of July 1964.

(SEAL)

Attest:

ESTON G. JOHNSON
Attesting Officer

EDWARD J. BRENNER
Commissioner of Patents